UNITED STATES PATENT OFFICE.

CURT WEIGELT, OF BERLIN, GERMANY.

PROCESS OF MAKING FERTILIZERS.

SPECIFICATION forming part of Letters Patent No. 524,813, dated August 21, 1894.

Application filed June 1, 1891. Serial No. 394,745. (No specimens.)

*To all whom it may concern:*

Be it known that I, CURT WEIGELT, a subject of the King of Prussia, residing at Berlin, in the Kingdom of Prussia and German Empire, have invented certain new and useful Improvements in Processes of Making Fertilizers, of which the following is a description.

This invention relates to an improved process of manufacturing fertilizers and train-oil from fish and meat refuse, and it consists in the treatment of the animal refuse by mixing the same with potassium salts, whereby not only the greater part of the water contained in the material is separated in the form of a lye, but also the impregnation of the material by an antiseptic salt produced. The most effective salts to be employed for my process are, potassium chlorid, potassium sulfate, and potassium magnesium sulfate. The quantity of the salt employed varies from three to ten per cent. of the quantity of the animal refuse to be treated.

My improved process is applicable, with the same satisfactory result, to fresh as well as partly rotten material. When the animal refuse contains fatty matter, it is advisable to combine with the production of fertilizing material also the recovery of the fatty matter, which is of special advantage in all cases in which the quantity of fat in the material to be treated is more than two per cent. of the latter.

In carrying out my invention, several processes that differ slightly according to the properties of the animal refuse are employed.

I. *Process of treating lean animal refuse.—* The larger kinds of fish, crustaceans, or meat refuse are first reduced in size in any suitable manner, for instance, by cutting them into small slices, while the smaller kinds of fish, crustaceans or parts of the same from two hundred grams down to fifty grams in weight, are simply sliced by making longitudinal incisions into their sides, while still smaller bodies are cut up by passing them through a meat-cutting machine. The material which is made capable of diffusion in this manner, is carefully salted with one of the before-mentioned salts or with a mixture of some of the same, by simply spreading the salt over the material, which is then permitted to stand in suitable wooden or metallic vessels from three to five days, so as to be subjected to the action of the salt. A stirring or loosening of the material during this time is not necessary as the same draws quickly a lye owing to the high endosmotic property of the salts employed in the salting of the material, so that the separation of from five to twenty-five per cent. of the water contained in the salted material is produced. The lye thus obtained is drawn off, the remaining material drying readily without the employment of artificial heat, so that it can be ground up in an ordinary grinding-mill to a meal of sawdust-like consistence. The meat of the leaner kinds of fish can be dried by the foregoing method in a space having but little draft in from twelve to sixteen days, and is then ready for grinding. This ground mass forms a fertilizer that contains a considerable quantity of nitrogen, which is enriched by the potassium-salt that has penetrated the mass and which is well adapted as a fertilizer for plants and vegetables the proportion of phosphoric-acid in which corresponds to the quantity of the bones in the same.

In the lye are contained, besides the greater quantity of the salts employed, the soluble ingredients of the meat, which contains an average of about 0.8 per cent. of nitrogen. By heating the lye up to the coagulation-temperature of the albuminous bodies in the same, a part of the nitrogen contained in said bodies can be directly obtained by precipitation, while another part of the same can be utilized with a part of the potassium-salt by filtration through peat, peaty moss or peaty earth for fertilizing purposes. If the market-price of nitrogenous fertilizers is relatively high, it may be advisable to evaporate the lye to a powder-form.

II. *Process of treating fatty animal refuse.—* With fatty animal refuse it is impossible to produce a direct drying of the salted material so as to prepare it ready for grinding, even by the use of artificial heat. While it is possible to evaporate from forty to fifty per cent. of the water contained in the salted material in from six to eight days by the air at ordinary temperature, the partly-dried material can only be made ready for grinding by comminuting it and then extracting the fatty matter contained in the same in any approved extracting apparatus by means of a suitable volatile solvent. After the evaporation of the extracting medium, the extracted oil remains, while the evaporated solvent is regained by condensation. The extracted material can now be quickly and completely dried and artificial heat be employed if desired.

Fish, crustaceans, or parts of the same, as well as meat-refuse in general, which contain more than two per cent. of fatty matter are first comminuted in a meat-cutting machine into an easily flowing mass which is mixed with salt as before described and then allowed to stand for about two or three days. It is then heated by means of steam, and eventually at a suitable pressure, to 100° centigrade, and then pressed out. The cakes obtained thereby contain a much smaller quantity of fat and salt and can be dried readily by the action of the atmosphere. These cakes are then ground into a pulverized fertilizer. With material rich in fatty matter, it is also advisable to extract the fat from the dry pressed out material by benzine in a suitable extracting apparatus. By the pressing of the mass about fifty per cent. of the water contained originally in the animal refuse is separated and the greater part of the fat or oil obtained directly by simply ladling it off from the surface of the lye. The remaining lye contains still a small quantity of soluble nitrogenous bodies (about 0.5 per cent.) which can be separated from the solution in the manner before described.

By employing comparatively more expensive salts such as potassium-sulfate, the process can be modified in such a manner that the comminuted mass is first subjected to evaporation before being salted, and then subjected to a moderate pressure, after which the cakes are again passed through a meat-cutting machine. The mass thus obtained is then salted and subjected under high pressure for from three to five days to the diffusing influence of the salts and then spread out for drying. In this manner any loss of salt is entirely obviated. As raw material can be worked up by my improved process besides fish and parts of the same, also such animal refuse which has no marketable value or which is damaged to such an extent that it is not marketable as food for human consumption.

III. *Process of treating material which is disintegrated by the salting process.*—The carrying out of the before-described process is connected with some difficulties when working up very soft animal refuse, fish, &c., as this material is disintegrated by the salting with potassium-salts so as to resist the drying influence of the air, while the drying of the same by artificial heat is connected with considerable difficulty. For transforming such soft material into a dry state, it is preferable, after mixing it with the potassium-salt to add from ten to twenty per cent. of peat, peaty moss, peaty earth, or similar material, so that a more or less compact mass is obtained which is then spread out in a thin layer and quickly dried by the action of the air. The dry mass forms an artificial guano that contains from six to eight per cent. of nitrogen. When larger quantities of the mixture of soft material and peat, &c., have to be worked up, the mass can also be molded with advantage into bricks, either by means of hand-operated implements or by brick-machines. These bricks can then be readily dried by the action of the atmospheric air.

Having thus described my invention, I claim as new and desire to secure by Letters Patent—

1. The process herein described of producing fertilizers from fish, crustaceans and waste parts of the same and meat-refuse in general, which consists in the following steps: first, comminuting the material; second, mixing it with a potassium-salt; third, subjecting the so-salted material for a certain length of time to the action of said salt until a lye is formed; fourth, drawing off the lye, and lastly, drying and grinding the remaining materials, substantially as set forth.

2. The process herein described, of producing fertilizers and fatty matter from fish, crustaceans and waste parts of the same, and from meat-refuse in general, which consists, first, in mixing the comminuted material with potassium salts; secondly, subjecting the said material to the action of said salts for a certain length of time so as to draw a lye; thirdly, drawing off the lye; fourthly, extracting the fatty matter contained in the remaining mass, and, finally, drying and grinding the extracted material, substantially as set forth.

In witness whereof I have hereunto set my hand in presence of two witnesses.

CURT WEIGELT.

Witnesses:
W. BINCLEWALD,
J. ZIMMERMANN.